(12) United States Patent
Acharya et al.

(10) Patent No.: US 6,940,854 B1
(45) Date of Patent: Sep. 6, 2005

(54) SYSTEMS AND METHODS FOR DETERMINING PRIORITY BASED ON PREVIOUS PRIORITY DETERMINATIONS

(75) Inventors: Yatin R. Acharya, Sunnyvale, CA (US); Shr-Jie Tzeng, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 864 days.

(21) Appl. No.: 09/814,817

(22) Filed: Mar. 23, 2001

(51) Int. Cl.[7] .......................... H04L 12/28; H04L 12/56
(52) U.S. Cl. ...................... 370/389; 370/473; 370/474
(58) Field of Search ............................... 370/389, 473, 370/474, 351, 392, 400, 401, 394, 475, 397, 370/471, 399, 349, 359, 419, 428, 360, 276, 370/277, 413, 469, 395.31, 395.32, 395; 709/249, 238, 240, 229, 235, 230, 236, 250, 709/207, 231, 232, 246, 201; 712/225, 226, 712/1, 220; 718/1, 100, 102

(56) References Cited

U.S. PATENT DOCUMENTS

| | | | | |
|---|---|---|---|---|
| 5,920,566 | A * | 7/1999 | Hendel et al. | 370/401 |
| 6,185,214 | B1 * | 2/2001 | Schwartz et al. | 370/401 |
| 6,226,267 | B1 * | 5/2001 | Spinney et al. | 370/235 |
| 6,259,699 | B1 * | 7/2001 | Opalka et al. | 370/398 |
| 6,404,752 | B1 * | 6/2002 | Allen et al. | 370/335 |
| 6,426,943 | B1 * | 7/2002 | Spinney et al. | 370/235 |
| 6,430,184 | B1 * | 8/2002 | Robins et al. | 370/392 |
| 6,460,120 | B1 * | 10/2002 | Bass et al. | 711/148 |
| 6,463,067 | B1 * | 10/2002 | Hebb et al. | 370/413 |
| 6,522,188 | B1 * | 2/2003 | Poole | 327/407 |
| 6,587,463 | B1 * | 7/2003 | Hebb et al. | 370/392 |
| 6,608,816 | B1 * | 8/2003 | Nichols | 370/235 |
| 6,687,247 | B1 * | 2/2004 | Wilford et al. | 370/392 |
| 6,711,153 | B1 * | 3/2004 | Hebb et al. | 370/351 |
| 6,751,191 | B1 * | 6/2004 | Kanekar et al. | 370/217 |
| 6,754,219 | B1 * | 6/2004 | Cain et al. | 370/401 |
| 6,766,381 | B1 * | 7/2004 | Barker et al. | 709/246 |
| 6,769,033 | B1 * | 7/2004 | Bass et al. | 709/246 |
| 6,798,743 | B1 * | 9/2004 | Ma et al. | 370/235 |
| 2001/0043614 | A1 * | 11/2001 | Viswanadham et al. | 370/469 |
| 2002/0057654 | A1 * | 5/2002 | Hjalmtysson | 370/252 |
| 2002/0099855 | A1 * | 7/2002 | Bass et al. | 709/249 |

* cited by examiner

Primary Examiner—Wellington Chin
Assistant Examiner—Jamal A. Fox
(74) Attorney, Agent, or Firm—Harrity & Snyder LLP (57) ABSTRACT

A network device determines priority of a packet based on the priority of one or more previously-received packets. The network device includes a memory, a forwarding engine, and a processor. The memory stores priority information for one or more previously-received packets. The forwarding engine generates the priority information stored in the memory. The processor determines whether to apply the priority information stored in the memory to a received packet. When the priority information applies to the received packet, the processor sends the priority information to the forwarding engine. In response to the priority information, the forwarding engine bypasses the generation of priority information for the received packet and thus cuts down on processing time in the switch and, by doing so, reduces the end-to-end latency for the packet in the network.

20 Claims, 4 Drawing Sheets

SYSTEMS AND METHODS FOR DETERMINING PRIORITY BASED ON PREVIOUS PRIORITY DETERMINATIONS

TECHNICAL FIELD

The present invention relates generally to communication systems and methods and, more particularly, to systems and methods for determining the priority of a packet based on the priority of one or more previously-received packets.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of packets and includes logic for receiving and forwarding packets to their appropriate destinations.

Conventional network switches typically include a forwarding engine that operates upon received packets to determine the priority of the packets. For example, high priority packets may include packets that require lower access latency, such as packets destined for a multimedia application. Low priority packets may include any other types of packets.

In some conventional switches, the process for determining priority includes analyzing packet header information to generate the packet priority information for the packet. The forwarding engine, in this case, determines priority for each received packet independently. The forwarding engine does not use information regarding previous priority determinations to identify the packet priority information for a subsequent packet.

DISCLOSURE OF THE INVENTION

There exists a need for systems and methods that facilitate the determination of packet priority by taking advantage of the fact that packets typically arrive in bursts and the same kinds of packets usually arrive together on a particular input port. Systems and methods consistent with the present invention address this and other needs by using previous priority determinations, when appropriate, to determine the priority of subsequent packets. This improves the efficiency and throughput of a network switch.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a network device that determines priority of a packet based on the priority of one or more previously-received packets. The network device includes a memory, a forwarding engine, and a processor. The memory stores priority information relating to one or more previously-received packets. The forwarding engine generates the priority information stored in the memory. The processor determines whether to apply any of the priority information stored in the memory to a received packet. When the priority information applies to the received packet, the processor sends the priority information to the forwarding engine. In response to the priority information, the forwarding engine bypasses the generation of priority information for the received packet.

In another implementation consistent with the present invention, a method determines the priority of packets received by a network device. The method includes storing, in a memory, priority information for one or more packets previously-received by the network device; subsequently receiving a plurality of packets; determining whether any of the stored priority information relates to each of the subsequent packets; identifying a priority for one or more of the subsequent packets based on the stored priority information when the stored priority information relates to the subsequent packet(s); and generating a priority for the subsequent packet(s) when the stored priority information does not relate to the subsequent packet(s).

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

SWITCH ARCHITECTURE OVERVIEW

Figure 1:
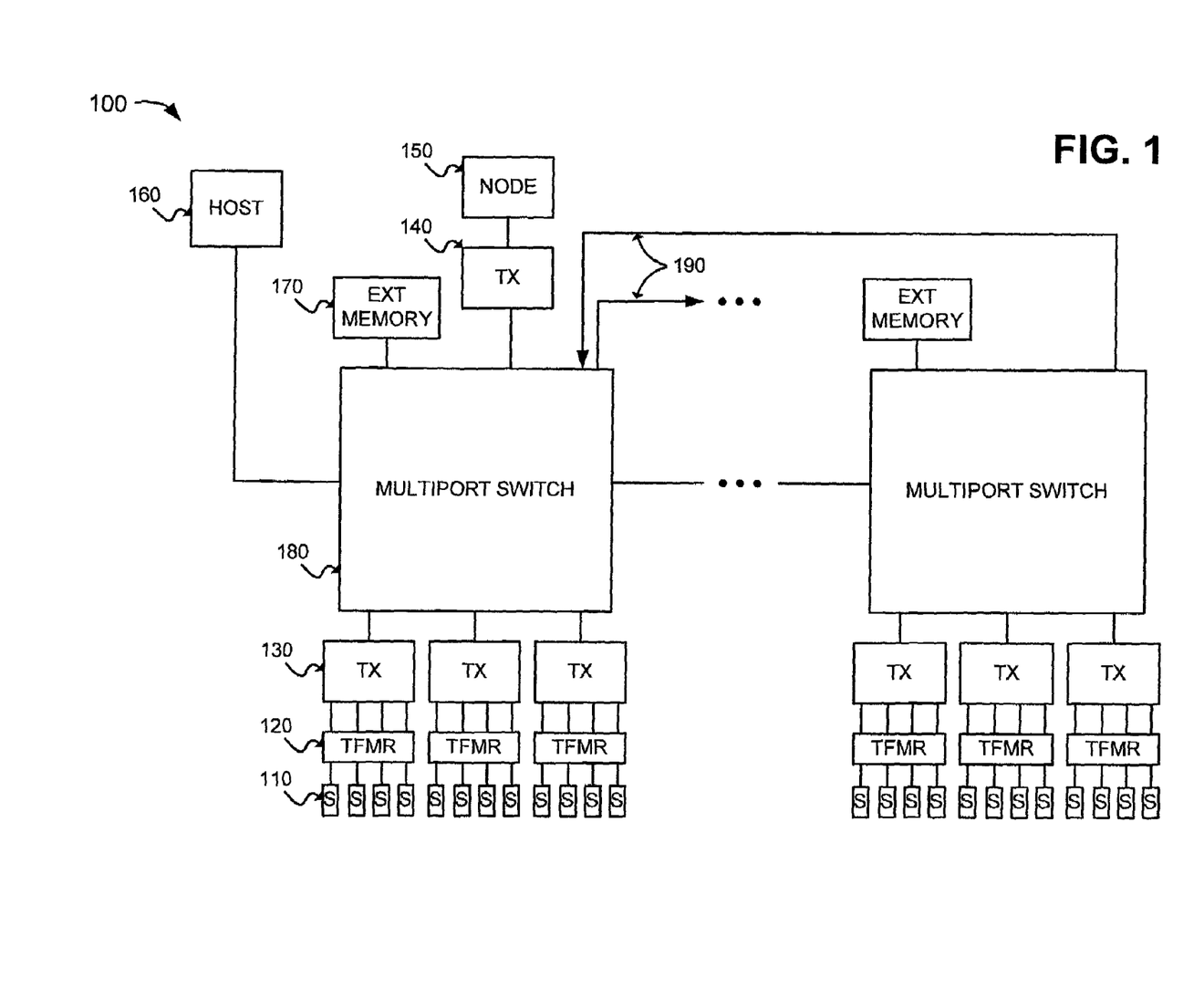
FIG. 1 is a block diagram of an exemplary system in which systems and methods consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 010/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
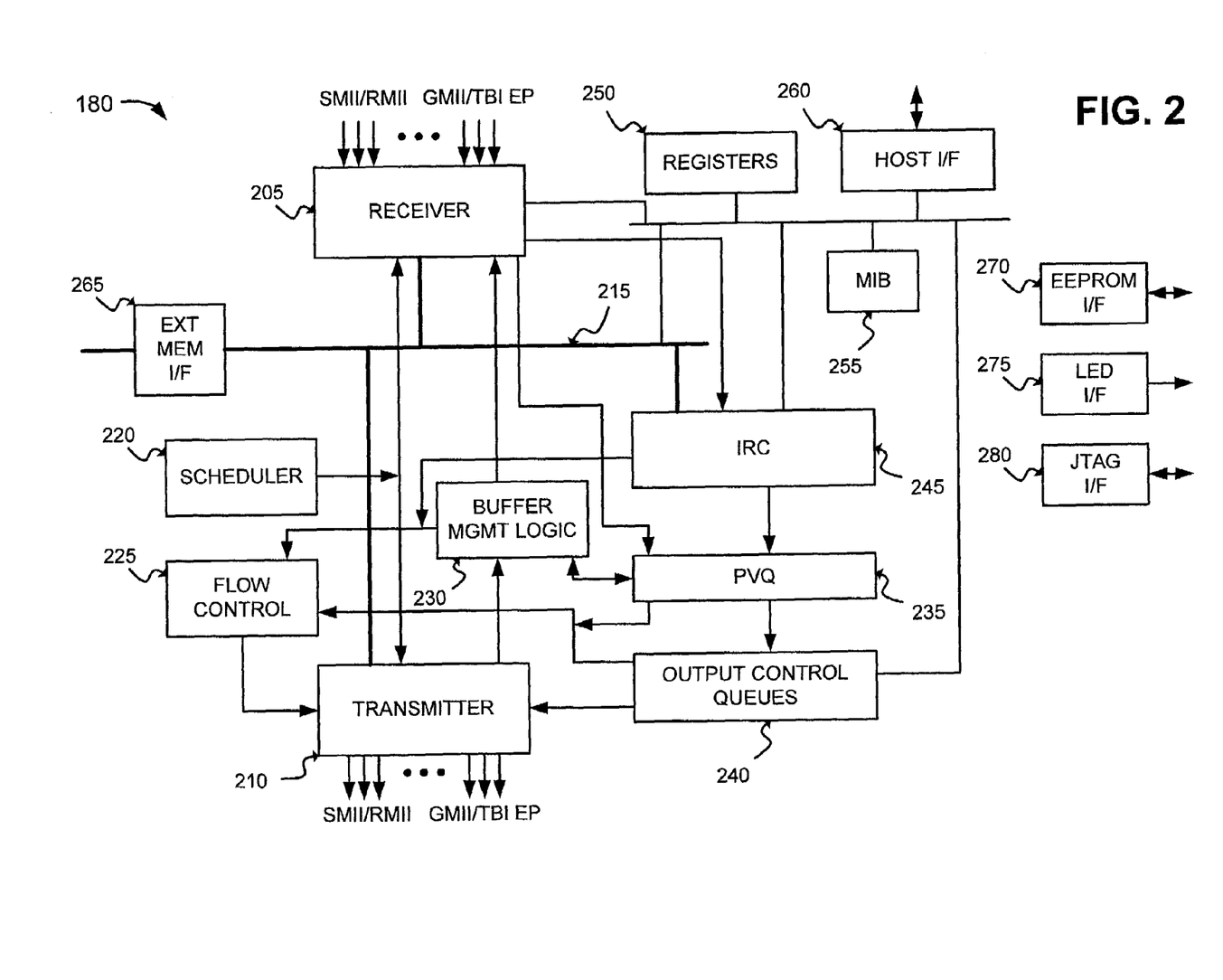
FIG. 2 is a detailed diagram of a multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, token bucket logic 238, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue.

The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

EXEMPLARY RECEIVER PROCESSING LOGIC

The present invention is directed to embedded processor logic that facilitates the priority determination of packets received by a network device, such as the multiport switch 180, thereby reducing the load on the IRC 245 and increasing the throughput of the multiport switch 180.

Figure 3:
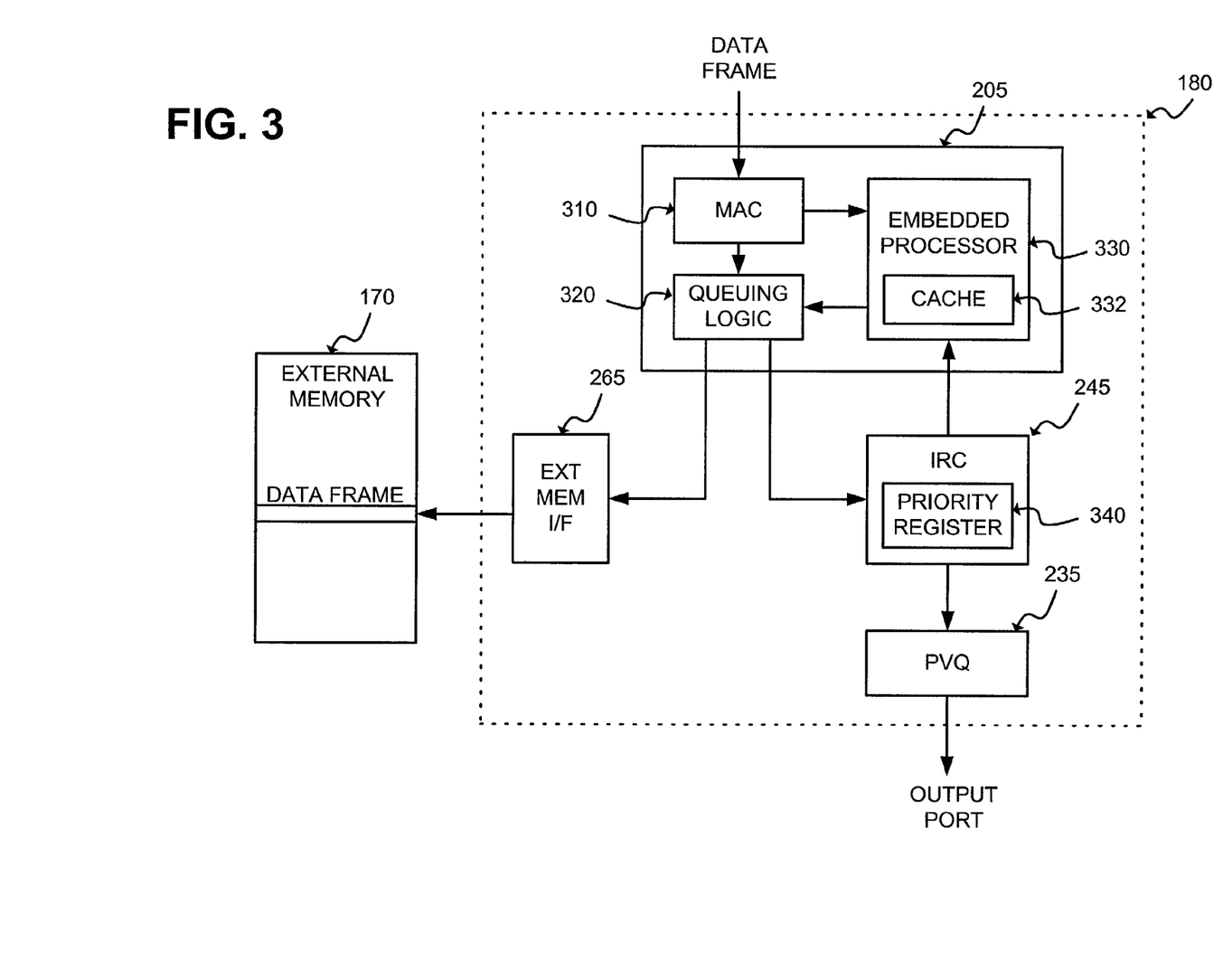
FIG. 3 is a diagram of a portion of the multiport switch of FIG. 2 according to an implementation consistent with the present invention.

FIG. 3 is a detailed diagram of a portion of the multiport switch 180 according to an implementation consistent with the present invention. The portion of the multiport switch 180 shown in FIG. 3 includes the receiver 205, the PVQ 235, the IRC 245, and the external memory interface 265. The receiver 205 may include MAC module 310, queuing logic 320, and embedded processor 330. The MAC module 310 may include multiple receive FIFO buffers that correspond to the input ports of the switch 180. Each of the receive FIFO buffers may include a FIFO that temporarily buffers data frames received on the corresponding input port.

The queuing logic 320 may include logic responsible for transferring data frames from the receive FIFO buffers to the external memory 170 via the external memory interface 265 and header information from the data frames to the IRC 245. The embedded processor 330 may include logic for determining a priority associated with a received data frame. The embedded processor 330 may include a memory, such as cache 332, that stores previous priority determinations, along with other pertinent information relating to the data frame, such as the source address, the destination address, the input port on which the data frame arrived, etc. When a data frame is received by the MAC module 310, the embedded processor 330 may determine whether to apply one of the previous priority determinations stored in the cache 332 to the received data frame.

The IRC 245 may include logic that makes the priority determinations. For example, the IRC 245 may include a priority register 340 that stores priority information. In some implementations, the IRC 245 may analyze the header information of a received data frame to locate its priority bits. The IRC 245 may then use the priority bits as an index into the priority register 340. The priority register 340 may map the priority bits to a level of priority. For example, the IRC 245 may determine, based on the priority information in the priority register 340, that a data frame should receive a high priority or a low priority. In alternative implementations consistent with the present invention, the number of priorities associated with the data frame may be greater than two. Also, in other implementations consistent with the present invention, the IRC 245 may analyze the header information to determine the priority of the data frame. For example, the IRC 245 may base the priority determination on the destination of the data frame, the type of data frame, or user-defined criteria. In any case, the IRC 245 may provide its priority determinations to the embedded processor 330 for storage in its cache 332.

EXEMPLARY PROCESSING

Figure 4:
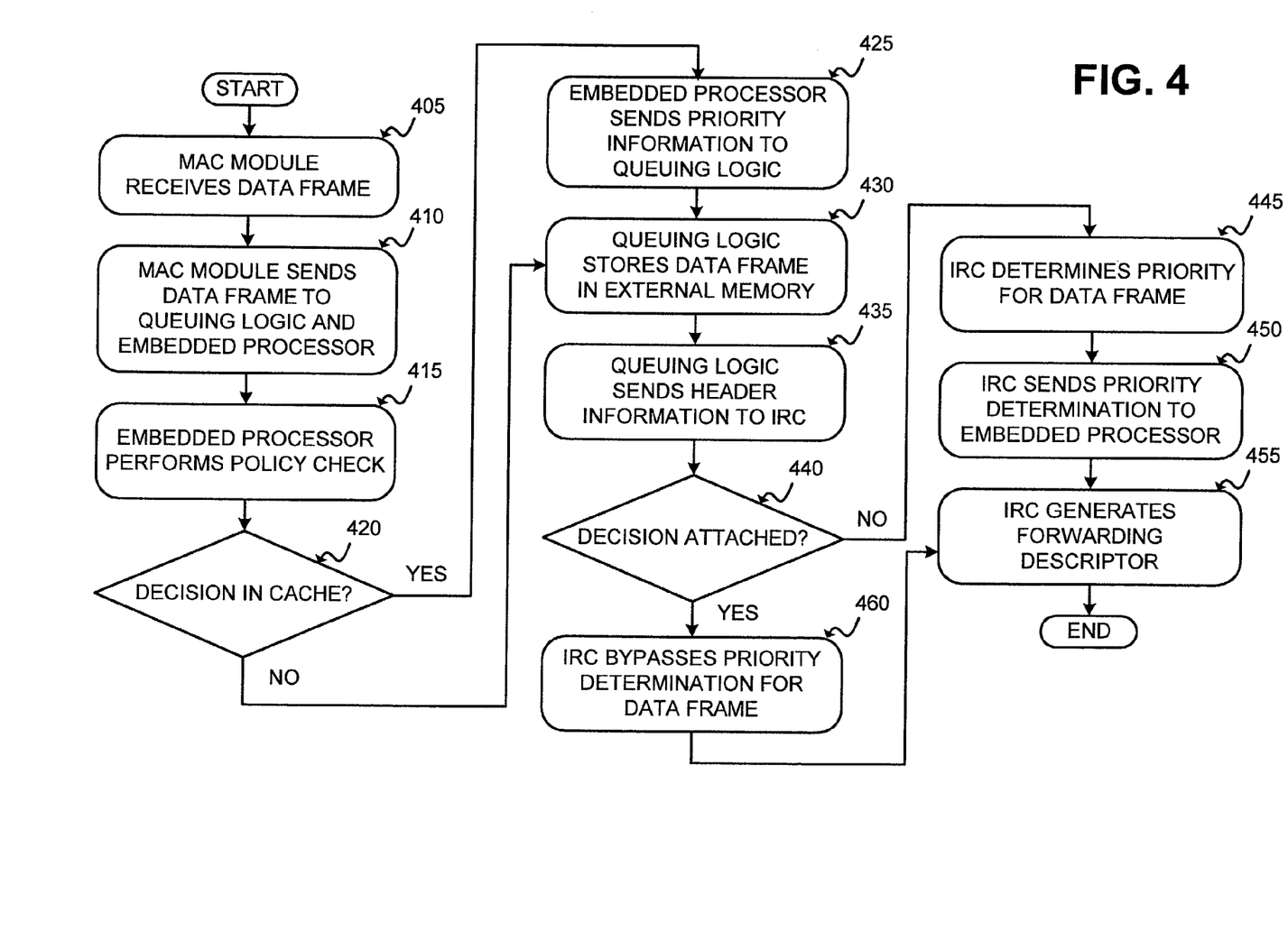
FIG. 4 is a flowchart of exemplary processing for determining the priority of a data frame received by the multiport switch of FIG. 2 according to an implementation consistent with the present invention.

FIG. 4 is a flowchart of exemplary processing for determining the priority of a data frame received by the multiport switch 180 according to an implementation consistent with the present invention. Processing may begin when a data frame is received by the receiver 205 at an input port. The MAC module 310 may receive the data frame from the input port [act 405]. The MAC module 310 may send the data frame to the queuing logic 320 and to the embedded processor 330 [act 410].

The embedded processor 330 may perform a policy check on the received data frame to determine whether the cache 332 stores a previous priority determination related to the data frame [act 415]. For example, the embedded processor 330 may determine whether the received data frame relates to any previous priority determinations. The embedded processor 330 may identify the conditions on which two data frames may be considered related. For example, the embedded processor 330 may determine relatedness based on the input ports on which the data frames were received, the source addresses of the data frames, and/or the destination addresses of the data frames. In other words, the embedded processor 330 may identify two data frames as related if they were received on the same input port and have the same source and destination addresses. Of course, the embedded processor 330 may use other techniques to determine whether to use a previous priority determination for a received data frame. For example, the embedded processor 330 may use the VLAN address information to determine whether two data frames are related or it may use information from the transport layer header in the data frames to determine whether the data frames belong to a particular flow.

When the embedded processor 330 determines that the cache 332 stores a previous priority determination related to the received data frame [act 420], the embedded processor 330 reads the previous priority determination from the cache 332 and sends it to the queuing logic 320 [act 425]. The queuing logic 320 may attach the previous priority determination to the data frame and send a portion of the data frame to the external memory 170 via the external memory interface 265 [act 430]. The queuing logic 320 may also send a portion of the data frame, such as the header information, along with the previous priority determination, to the IRC 245 [act 435].

When the embedded processor 330 determines that the cache 332 does not store a previous priority determination for the received data frame [act 420], the embedded processor 330 may inform the queuing logic 320 of this fact. The queuing logic 320 may attach an indicator to the data frame that indicates that there is no previous priority determination for the data frame. The queuing logic 320 may then send a portion of the data frame to the external memory 170 via the external memory interface 265 [act 430]. The queuing logic 320 may also send a portion of the data frame, such as the header information, along with the attached indicator, to the IRC 245 [act 435].

When the IRC 245 receives the header information for the received data frame, the IRC 245 may analyze the information to determine whether a previous priority determination is attached [act 440]. If priority information is not attached, the IRC 245 may determine the priority for the received data frame [act 445]. The IRC 245 may determine the priority by locating the priority bits in the header information. The IRC 245 may use the priority bits as an index into the priority register 340. The priority register 340 may map the priority bits to a level of priority. For example, the IRC 245 may determine, based on the priority information in the priority register 340, that the data frame should be given a high priority or a low priority. When the data frame does not include priority bits, the IRC 245 may determine the priority based on other criteria, such as user-defined criteria.

In any case, the IRC 245 may send the priority determination to the embedded processor 330 for storage in its cache 332 [act 450]. The embedded processor 330 may use the priority determination to determine the priority for subsequent data frames. The IRC 245 may then generate a forwarding descriptor that contains forwarding information for the received data frame and send the forwarding descriptor to the PVQ 235, as described above [act 455].

When priority information is attached to the header information received from the queuing logic 320 [act 440], the IRC 245 may bypass the priority determination for the data frame [act 460]. In this case, the IRC 245 may use the attached priority information in generating the forwarding descriptor [act 455]. The IRC 245 may then send the forwarding descriptor to the PVQ 235, as described above.

Described has been systems and methods for determining the priority of frames received by the multiport switch 180. By taking advantage of the fact that frames usually arrive in bursts and similar frames usually arrive together, the systems and methods consistent with the present invention maximize the efficiency and throughput of the multiport switch 180.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while a series of acts has been described with regard to FIG. 4, the order of the acts may differ in other implementations consistent with the present invention.

What is claimed is:

1. A system for determining priority of a packet by a network device, comprising:
    a memory configured to store priority information relating to one or more previously-received packets;
    a forwarding engine configured to generate the priority information stored in the memory; and
    a processor configured to determine whether to apply the priority information stored in the memory to a received packet and send first priority information of the priority information stored in the memory to the forwarding engine when the first priority information applies to the received packet, the forwarding engine bypassing generation of priority information for the received packet when the processor indicates that the first priority information applies to the received packet.

2. The system of claim 1, wherein the processor is configured to determine whether the received packet relates to one of the previously-received packets.

3. The system of claim 2, wherein the processor is configured to determine relatedness based on a relationship of at least one of input ports, source addresses, or destination addresses associated with the received packet and the one previously-received packet.

4. The system of claim 3, wherein the processor is configured to determine that the received packet is related to the one previously-received packet when the received packet and the one previously-received packet at least one of arrived at a same input port of the network device, include a same source address, and include a same destination address.

5. The system of claim 1, wherein the processor is further configured to inform the forwarding engine when none of the priority information stored in the memory applies to the received packet.

6. The system of claim 5, wherein the forwarding engine is configured to generate priority information for the received packet when the processor informs the forwarding engine that none of the priority information stored in the memory applies to the received packet.

7. The system of claim 6, wherein the forwarding engine is further configured to send the generated priority information for the received packet to the memory.

8. The system of claim 6, wherein the forwarding engine is configured to identify priority data in the received packet and map the priority data to a priority level for the received packet.

9. The system of claim 8, wherein the forwarding engine is further configured to send the priority level as the generated priority information for the received packet to the memory.

10. A method for determining priority of packets by a network device, comprising:
    storing, in a memory, priority information relating to one or more packets previously-received by the network device;
    subsequently receiving a plurality of packets;
    determining whether any of the stored priority information relates to each of the subsequent packets;
    identifying a priority for one or more of the subsequent packets based on the stored priority information when the stored priority information relates to the one or more subsequent packets; and
    generating a priority for the one or more subsequent packets when the stored priority information does not relate to the one or more subsequent packets.

11. The method of claim 10, wherein the determining includes:
    determining whether each of the subsequent packets corresponds to one of the previously-received packets.

12. The method of claim 11, wherein the determining whether each of the subsequent packets corresponds to one of the previously-received packets includes:
    using a relationship of at least one of input ports, source addresses, or destination addresses associated with the subsequent packets and the previously-received packets to determine whether each of the subsequent packets corresponds to one of the previously-received packets.

13. The method of claim 12, wherein the using a relationship includes:
    identifying one of the subsequent packets as corresponding to one of the previously-received packets when the one subsequent packet and the one previously-received packet at least one of arrived at a same input port of the network device, include a same source address, or include a same destination address.

14. The method of claim 10, wherein the generating a priority includes:
    identifying priority data in the one or more subsequent packets, and
    mapping the priority data to priority information for the one or more subsequent packets.

15. The method of claim 14, further comprising:
    storing the priority information in the memory.

16. A multiport network device, comprising:
    a plurality of input ports;
    a plurality of input buffers associated with the input ports and configured to temporarily store packets received at the associated input ports;
    a memory configured to store priority information for one or more packets previously-received at the input ports;
    a forwarding engine configured to generate the priority information stored in the memory; and
    processing logic configured to determine whether the memory stores priority information relating to each of the packets stored by the input buffers and, when the memory stores priority information relating to a first one of the packets stored by the input buffers, send the stored priority information to the forwarding engine, the forwarding engine bypassing the generation of priority information for the first packet in response to receipt of the stored priority information.

17. The multiport network device of claim 16, wherein when determining whether the memory stores priority information relating to each of the packets stored by the input buffers, the processing logic is configured to determine whether each of the packets stored by the input buffers relates to one of the one or more previously-received packets.

18. The multiport network device of claim 16, wherein when the memory stores no priority information relating to the first packet, the forwarding engine is configured to generate priority information for the first packet.

19. The multiport network device of claim 18, wherein when generating priority information for the first packet, the forwarding engine is configured to identify priority data in the first packet and map the priority data to a priority level for the first packet.

20. The multiport network device of claim 18, wherein when generating priority information for the first packet, the forwarding engine is configured to analyze header information for the first packet and generate the priority data for the first packet based on the analyzed header information.

* * * * *